Feb. 28, 1939.   R. ERBAN   2,148,857
TRANSMISSION DEVICE
Filed Jan. 24, 1934   2 Sheets-Sheet 1
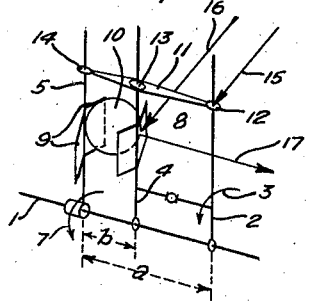
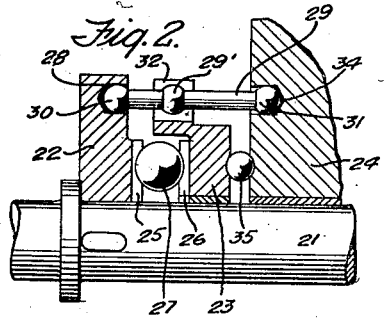
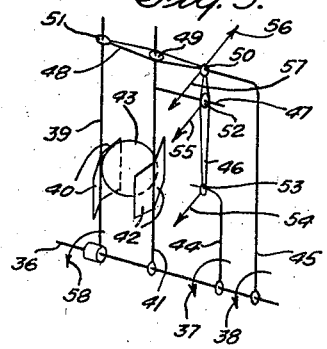
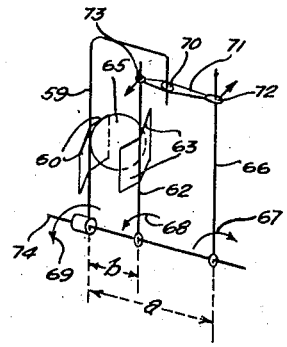
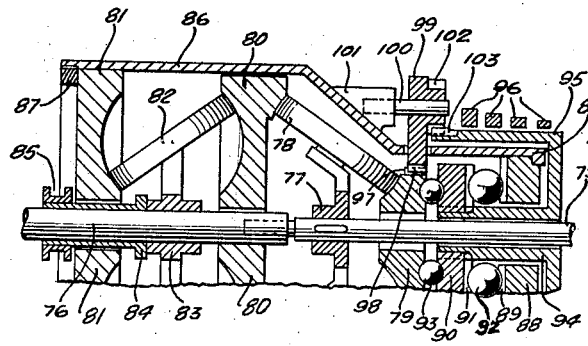
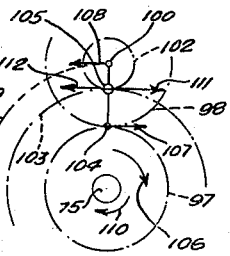
INVENTOR
RICHARD ERBAN
BY
ATTORNEY

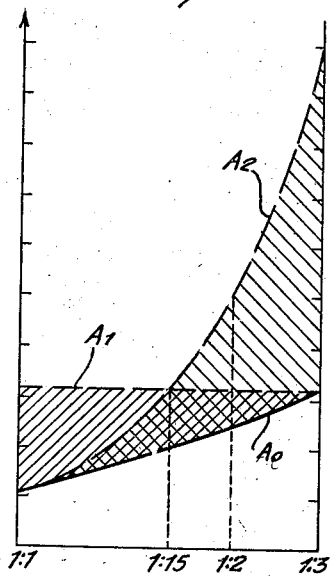
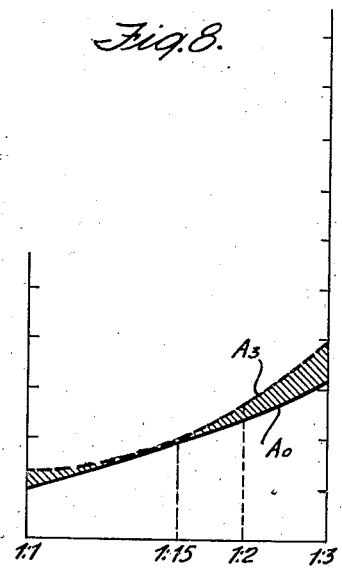

Patented Feb. 28, 1939

2,148,857

UNITED STATES PATENT OFFICE 2,148,857

TRANSMISSION DEVICE

Richard Erban, Vienna, Austria, assignor to Erban Patents Corporation, a corporation of New York Application January 24, 1934, Serial No. 708,024
In Austria March 11, 1933

16 Claims. (Cl. 74—281)

My invention relates to gears and more particularly to friction gears, and the object of my invention is to provide for such gears a pressure device so designed that by a slight axial relative movement between two parts, axial pressures are produced, which are proportional to the torque transmitted by the said two parts and which are used to cause the parts of the gear which are in frictional engagement to be pressed against each other. As a rule, such pressure devices comprise opposed inclined faces and two or more rolling bodies, e. g. balls or rollers, provided between said faces. Where the angle of pitch of the inclined faces is comparatively great, the rolling bodies are frequently omitted, in which event the inclined faces, which in that case usually have the shape of helical faces are in direct mutual sliding engagement. In all cases, the torque is imparted to the one part of the pressure device, which may be secured to the gear shaft, and is transmitted by the other part which may be secured to a gear element loosely mounted on said shaft. Therefore, the axial force produced by the pressure device is proportional to the torque which is exerted by the gear element connected with the pressure device. Where this torque is relatively small, while the required axial force is relatively great, the inclined faces usually have very small angles of pitch, resulting in various well-known drawbacks. Moreover, with such a pressure device, it is impossible to produce axial forces the variations of which are proportional to the variations of the sum or the difference of the torques which are exerted by the various parts of the gear.

The pressure device, according to the present invention, is so designed that the torque used for the production of the axial force is imparted to the pressure device by an intermediate transmission. By such a transmission, the produced axial forces can be increased corresponding to the ratio of transmission. Furthermore, such a transmission enables the pressure device to be connected with various parts of the gear, so that the torque effective in the pressure device corresponds to the sum, or the difference, of a plurality of various torques, while, moreover, said sum, or difference, or one of its components can be increased or decreased, depending on the ratio of transmission of the transmitting systems used. The ratio of transmission can also be variable, or can be controlled from the outside so that the produced axial force can be made dependent, to any desired extent, on the torque as well as on other factors, such as the ratio of transmission of the gear, the velocity of the parts etc.

In the accompanying drawings, in which I have shown, by way of illustration, various embodiments of my invention, Fig. 1 is a perspective diagrammatic view of a simple embodiment of the invention, while Fig. 2 is a longitudinal sectional view of this embodiment; Figs. 3 and 4 are views similar to Fig. 1 showing modifications; Fig. 5 is a longitudinal sectional view of a further embodiment; Fig. 6 is a diagrammatic illustration of the ratio of transmission of the embodiment shown by Fig. 5; Figs. 7 and 8 are diagrams showing the various axial forces produced.

Fig. 1 illustrates how by means of a system of levers the axial force produced by the pressure device is increased by an increase of the torque imparted to the pressure device.

1 indicates the common gear shaft, on which is rotatably and axially movably mounted a gear element, indicated by 2, and adapted to rotate in the direction of the arrow 3. The gear element 2 is connected with the shaft 1 by means of a pressure device producing an axial force proportional to the torque transmitted from 2 to 1 (or vice versa). This pressure device is represented by the two parts indicated by 4 and 5, each of which parts carries a V-shaped pair of inclined faces, respectively indicated at 8 and 9, between which faces is provided a ball, indicated at 10. The part 5 is fastened to the shaft 1 while the part 4 is rotatably and axially movably mounted thereon. Between the parts 2, 4 and 5, there is provided a transmission, in the shape of a lever 11 which is articulately connected with the parts 2, 4 and 5, as indicated at 12, 13 and 14 respectively.

If the distance between 2 and 5 is designated as $a$ and the distance between 4 and 5 as $b$, the peripheral force 16 acting on the pair of inclined faces 8 at the ratio $a:b$ is greater than the force which would be active at those inclined faces, if the parts 2 and 4 were rigidly connected with each other. In the same proportion, also, the axial force 17 produced by the pressure device 8, 9 and 10 is increased. Therefore, there is effective in the pressure device a greater torque than the torque T2 originally transmitted by the part 2, said greater torque being $$\frac{a}{b} \cdot T2$$

The part 5, in turn, transmits to shaft 1 only a torque T2 in the direction of the arrow 7, that is, in the same direction as the part 2 as shown by the arrow 3. It is obvious that by a corresponding selection of the ratio of transmission $a:b$, any desired torque can be made to act in the pressure device 8, 9 and 10 and that thus the angles of pitch of the inclined faces can be made of any desired size. With small angles of pitch, the use of intermediate rolling bodies 10 is indispensable because with a gliding friction the resistance against movement would be too great to permit safe operation of the device. In case of an angle of pitch which would be smaller than the angle of friction, the device would not operate at all. On the other hand, with an angle of pitch of about 45° or 60°, the effect of the angle of friction of the gliding friction is very small (scarcely 10% depending on the character of the two gliding surfaces), and under these circumstances, it is possible to dispense with intermediate rolling bodies in the construction of pressure devices and thus to produce pressure devices which act proportionately to the variations of the transmitted torques.

The embodiment shown by Fig. 2 in longitudinal section corresponds to the diagram illustrated by Fig. 1. At 21 is shown the gear shaft, on which is secured the part 22, which is provided with a plurality of V-shaped inclined faces 25 distributed over its circumference. At its outer end, the part 22 has a plurality of cavities 28, one of which only is shown in Fig. 2 in section. The parts 23 and 24 are rotatably mounted on shaft 21; the part 24 represents a race-ring of a friction gear, the torque of which shall be transmitted to shaft 21 by the pressure device. The part 23 is provided with V-shaped inclined faces 26. Between these and the opposed inclined faces 25 of part 22 are provided balls 27, one of which only is shown. The part 23 is provided at the outer end with a plurality of radial slots 32 so distributed along the circumference as to be located directly opposite the cavities 28 provided in part 22, as well as opposite similar cavities 34 provided in part 24, as shown in Fig. 2. The transmission between the parts 22, 23 and 24 comprises rods 29, which at their ends are provided with ball-shaped heads 30 and 31 respectively, which respectively fit the cavities 28 and 34. The rods 29 also are provided intermediate the heads 30 and 31 with a ball-shaped enlargement 29′ fitting the radial slots 32 of the part 23.

From the foregoing, it is obvious that upon the rotation of part 24 all the rods 29 are also moved about shaft 21, which results in an increased torque being produced between the parts 22 and 23. On the assumption that the cavities 28 and 34 are spaced alike from shaft 21, the effective transmission is equal to the ratio of the distances 30—31 to 30—29′. When the device is in operation, the parts 23 and 24 also turn relatively to each other, so that for the transmission of the axial pressure produced by the pressure device 25, 26 and 27 from the part 23 to part 24 there must be interposed between said two parts a ball bearing shown at 35, in order to reduce the friction. However, since the relative movements between 23 and 24 are very small, the balls 35 can also be replaced by radially disposed cylindrical rollers moving on the parallelly ground flat opposed faces of the parts 23 and 24 so that the production of grooves for the balls 35 can be dispensed with. Further, it is obvious that the arrangement can be reversed in that the pressure device 25, 26 and 27 is placed between the parts 23 and 24, while the ball-bearing 35 is provided between the parts 22 and 23, without the operation of the device being in any material way changed thereby.

In the diagrammatic Figure 3, a construction is illustrated, in which two different torques of the same direction act, partly direct and partly increased by a transmission, on a pressure device. At 36 is indicated the shaft, to which is secured the part 39 provided with the inclined faces 40. Opposite the latter are disposed the inclined faces 42, which are provided on a part 41, which is rotatably and axially movably mounted on shaft 36 and which at its upper end carries a lateral projection 47, parallel to shaft 36, constituting a fulcrum for a lever 46. At 44 and 45 are shown other parts rotatably and axially movably mounted on shaft 36. On the part 44 there acts a torque T44 in the direction of the arrow 37, while on the part 45 there acts a torque T45, in the direction of the arrow 38. Therefore, also, the part 39 secured to shaft 36 will rotate in the direction of arrow 38. Between the inclined faces 40 and 42 is provided a ball 43. The part 44, by a joint 53, is pivotally connected with the free end of a lever 46, while the other end of this lever is pivotally connected by a joint 50 with the part 45. At 49 there is pivoted to the part 41 another lever 48, which by a joint 51 is connected with the part 39, and by a joint 50 with the part 45.

The operation of this construction is as follows:

If it is assumed that the two torques T44 and T45 are of such a size that the force 54 produced at the joint 53 balances the force 57 produced at the joint 50 in respect of the fulcrum 52 of the lever 46, the sum of the two torques is supplied to the part 41 by the lateral projection 47 and then, by means of the pressure device 42, 43 and 40 to the part 39 and thus to the shaft 36. Now, if, for example, the torque T45 is greater in relation to the torque T44 than is required for the state of balance hereinabove assumed, the balance between the reaction force 56 and the torque 57 produced by the torque T45 is disturbed at the joint 50, and since the force 57 is now greater than the force 56, the excess of force will operate the lever 48. Thereby, the pressure device 42, 43 and 40 is moved in the same direction as by the sum of the torques supplied through 52, 47 and 41. The total axial force thus produced is, therefore, larger than corresponding to the sum of the two torques T44 and T45.

Now, if, on the other hand, T45 is smaller than corresponding to the state of balance of the lever 46, the force 56 at the joint predominates, and the lever 46 is moved in the direction of the force 56 with the excess of force between 56 and 57. As a result of this movement, the pressure device 40, 43 and 42, by the lever 48, is partly relieved from the effect of the total force 55 acting at the joint 52. Therefore, an axial force is produced which is smaller than would correspond to the sum of the torques T44 and T45. Thus, a construction is provided which at any desired selective definite ratio between T44 and T45 produces an axial force proportional to the sum of these two torques. If this ratio is changed in favor of T45, the produced axial force is greater than the sum of the torques, and it is the greater, the further the ratio is changed in favor of T45. If the ratio between T44 and T45 is changed in the other direction, that is toward T37, the produced axial force of the pressure device is smaller than corresponds to the sum of the above said torques. In this manner, the produced axial forces for almost all types of gears with a variable transmission can be so determined that in all positions of the gear, the required force of pressure between the friction gears and their cooperating race-rings exists.

In Fig. 4 I have diagrammatically illustrated another construction, in which one of the two torques is supplied direct to the pressure device, while the second torque is imparted to the pressure device after a variation of its size, and after its direction of rotation has been reversed.

At 74 is indicated the shaft, to which is secured the part 59 which carries the inclined faces 60. Opposed to them are the inclined faces 63 which are provided on a part shown at 62; part 62 is rotatably and axially movably mounted on shaft 74. Between the inclined faces 60 and 63 is disposed the ball 65. One of the two torques T62 is supplied direct to the part 62, which thereby is rotated in the direction of the arrow 68. At 66 is shown a part which, like part 62, is rotatably and axially movably mounted on shaft 74; part 66 is subjected to a torque T66, which tends to rotate the part in the direction of the arrow 67, that is, in a direction opposite to part 62. The torque T66 is designed to act on the pressure device 60, 63 and 65 in the same direction as T62, and in an increased degree. To this end, there is pivoted to the part 59 at 70 a lever 71, which by a joint 73 is also connected with part 62 and by a joint 72 with the part 66. The forces acting at the joints 72 and 73 are indicated as regards their direction by small arrows. It is obvious that because of the ratio of transmission of the lever 71, there is exerted on the part 62 a force of an increased torque in the direction of the arrow 68. The torque transmitted by the part 59 to shaft 74 is in the direction of the arrow 69, as long as T62 is greater than T66, and as regards its size corresponds to the difference between said two torques. If the torques are of equal size and if the ratio of the arms of the lever 71 is 1:1, the torque transmitted to shaft 74 is nil; and still, there is produced by the pressure device 60, 65 and 63 an axial force corresponding to a torque of the size $$\frac{a}{b} \cdot (T62 + T66)$$

Fig. 5 shows an embodiment of the diagram illustrated in Fig. 4. The gear shown in Fig. 5 is a friction gear provided with adjustable friction rollers permitting the variation of the transmission ratio up to 1:1, the drive shaft and the driven shaft rotating in the same direction.

At 75 is shown the drive shaft to which is secured the roller support 77, on which are rotatably mounted a plurality of (non-adjustable) rollers 78. These move, on the one hand, on the race-ring 79, freely rotatable on shaft 75, and, on the other hand, on a track of the race-ring 80, rotatably mounted on the driven shaft 76. To the latter is secured the roller support 83 of the adjustable or tiltable rollers 82, and the shaft 76 is rotated by the rotation of said support 83. The adjustment of the rollers 82, for the purpose of varying the ratio of transmission, can be effected by a means of well-known construction, as indicated in Fig. 5 by a sleeve 84 provided with a grooved collar 85. The rollers 82 move, on the one hand, on the race ring 80 and, on the other hand, on the race ring 81, which is so connected with the cylindrical casing 86 that these two parts are coupled to rotate together, while, however, the race ring 81 is slightly axially movable so that by the nut 87 it can be adjusted within narrow limits.

When the race-ring 79 is held against rotation and the drive-shaft 75 is rotated, the race-ring 80 is rotated by the friction rollers 78 at greater speed than the shaft 75.

Now, if also the race-ring 81 is held against rotation, the roller-support 83 and thereby also the driven shaft 76 are rotated, because the adjustable rollers 82 move like planetary gears. Depending on the position of the rollers 82, the number of revolutions of the roller support 83 and of the shaft 76 varies. In the position of the rollers 82 shown in Fig. 5, the number of revolutions is greatest, and substantially like the number of revolutions of the driving shaft 75. If the rollers 82 are moved from the position shown clockwise, the number of revolutions of shaft 76 becomes smaller. The moment of reaction of the gear occurs at two parts of the gear, that is to say, at the race-ring 81 and the race-ring 79. The moment of reaction of the race-ring 79 acts in the same direction as the driving moment, while the moment of reaction of the race-ring 81 is opposite to that direction. Now, if the gear runs with a ratio of transmission of 1:1, the two moments of reaction are equally large, as will appear from Fig. 5, if one considers that in that case the torques at the drive shaft 75 and at the driven shaft 76 are equal to each other. However, since, as has already been stated, the moments of reaction of the rings 81 and 79 have opposite direction, that is to say, tend to rotate said rings in opposite direction, the two moments of reaction balance each other, and the total moment of reaction of the gear is nil. For the other positions of the adjustable rollers 82 the moment of reaction of the race-ring 81 predominates, so that there remains a positive total moment of reaction, the term "positive" being used for a reaction moment which has the opposite direction of the driving torque. Now, if the axial force of pressure between the rollers 82 and the race-rings 80, 81 in every position of the rollers 82, has a value, which as nearly as possible, approaches the required value, the axial force exerted on the gear must be proportional to the torque of shaft 76. A control of the axial force proportional to the torque of one of the two rings would result in considerably poorer conditions and a great excess of load, as has been fully explained in my copending application, Serial No. 679,843, filed on July 11, 1933. However, the sum of the torques of the race-rings 80, 81 can be used for adjustment, since said sum must always be equal to the torque of the roller carrier 83.

In the embodiment shown, the torque of the race-ring 81 is transmitted in a simple manner by means of a pressure device now to be described. At the right hand end of the cylindrical casing 86 there is secured a collar 88, which is provided with inclined faces 89. Another collar 90 provided with similar inclined faces 91 bears, by means of balls 93, against the race-ring 79, and is so disposed that space is provided for the balls 92 between the inclined faces 89, 91. Now, if the collar 90 is prevented from rotation, but is allowed to move axially, there will be produced in the pressure device 89, 92, and 91 an axial force, which is proportional to the torque of the race-ring 81. The collar 90 can be held against rotation, for example, by a hollow shaft 94, which on its periphery carries a brake-drum 95. By a brake-band, or, say, a helical flat spring 96, the said drum 95 can be prevented from rotation. The arrangement may be such, that the drum is prevented from rotation in one direction only, but is free to rotate in the other direction. The above described pressure device corresponds to the parts 59—62 in Fig. 4, the collar 90 corresponding to the part 59, the hollow shaft 94 to the shaft 74 and the collar 88 to the part 62 of Fig. 4.

It has been shown supra that the correct axial force would be produced, if there were transmitted by means of a pressure device a torque, corresponding to the algebraic sum of the torques of the two race-rings 80 and 81. Now, the moment of reaction of the ring 79 is at a constant ratio to the torque of the ring 80. It is decreased only in proportion to the sliding radius of the rollers 78 on the two rings 80 and 79 and moreover, as has been stated above, has the opposite direction of the torque of race-ring 81. Therefore, the torque of the ring 79 would have to be decreased in proportion to the transmission effected by the rollers 78, and reversed so that together with the torque of the ring 81 it would result in the required total output. To this end, there is provided in Fig. 5, in place of a simple lever transmission, a transmission by means of teeth, as illustrated in Fig. 6 by the partial circles and the effective lever arms. The ring 79 is provided on its circumference with teeth indicated at 97, which teeth are in mesh with teeth 98 of a sector 99 rotatably mounted on a pivot 100 secured in a projection 101 of the casing 86. Said sector 99 has a second rim of teeth 102 in mesh with a set of teeth 103 provided on the brake-drum 95. This construction corresponds to the lever 71 in Fig. 4, with the sole exception that said lever can be axially displaced, while the transmission shown in Fig. 5 acts radially. To the fulcrum 70 of lever 71 (Fig. 4) corresponds the point of contact 105 of the partial circles 102 and 103, which for the sake of simplicity are designated by the same reference numerals in Fig. 6 as the rims of the teeth in Fig. 5. To the joint 72 in Fig. 4 corresponds the point of contact 104 of the partial circles 97 and 98 and to the joint 73 the axis of rotation 100 of the toothed sector 99. In the calculation of the effective leverage the fact, of course, must be taken into consideration that the points 104, 105 and 100 lie in different radii.

If the drive shaft 75 rotates in the direction of the arrow 110 (Fig. 6), the ring 79 provided with the rim of teeth 97 will also rotate in the same direction, that is, in the direction of the arrow 106. The ring 80 also rotates in the direction of the arrow 106, while the ring 81 tends to rotate in the opposite direction, that is, in the direction of the arrow 109 (Fig. 6). The peripheral force 107 in the partial circle 97 is transmitted as force 108 on the axis 100. There occurs at the point 105, that is, in the partial circle 103 of the brake-drum 95 a force of reaction 111. To the force 108 corresponds a torque transmitted to the casing 86 of the same size as the torque of the ring 80. The total torque composed of the torques of the rings 80 and 81 in the casing 86 is transmitted by the pressure device 89, 92 and 91 to the brake-drum 95. To this total torque there corresponds in the partial circle 103 a peripheral force 112. When the gear transmission is 1:1, the forces 111 and 112 are equal and, therefore, balance each other. (The losses by friction are ignored.) In that case, the total moment of reaction of the gear is nil, and yet the construction above described permits by means of a single pressure device actuated by the moments of reaction to produce the axial force, proportional to the torque transmitted from shaft 75 to shaft 76, for exerting pressure on the gear.

The gear construction above described can also be used with slight changes in respect to the drive shaft and the driven shaft as a so-called differential gear, in which event, with the same arrangement of the pressure device, the axial force required in each case is likewise produced. It is then only necessary that the shaft 75, or the roller carrier 77 connected therewith, remain at rest, while the hollow shaft 94, or the brake-drum 95, must be driven. The driven shaft 76 remains connected with the roller carrier 83. In this case, one obtains a range of number of revolutions of the driven shaft 76 from about 0.7 of the number of revolutions of the driving shaft 75 to "stop", which occurs in the position of the rollers shown in Fig. 5. When the angle of inclination of the rollers 78 is smaller than the greatest possible angle of inclination of the rollers 82, one obtains numbers of revolution of the driven shaft 76 beyond the zero point in the reverse direction.

In the case of the described gear construction, it is especially important that the produced axial force is proportional to the torque of the roller carrier 83, because otherwise the gear would have to have much larger dimensions, to prevent it from being too quickly destroyed. This will be made clear with the aid of the diagrams of Figs. 7 and 8, in which the axial forces are shown on the axis of the ordinates and the various transmissions of the gear from 1:1 to 1:3 on the axis of the abscissae. Fig. 7 illustrates the axial forces which are produced by a pressure device, which is connected only with one of the rings 80 or 81. The curve A0 shows the axial force required in order to insure at a constant torque at the driving shaft a transmission free from sliding. As will be seen, this axial force ascends rather in a straight line in proportion to the transmission. Now, if there were connected a pressure device with the ring 80, or with the ring 79, there would result the straight line A1, that is to say, the axial force is constant and has always the highest value which is about three times that of its lowest value. In other words, the pressures in the gear are as great as if the threefold amount of work were transmitted. The losses are correspondingly great and the life of the gear is short. On the other hand, if the pressure device were connected with ring 81 only, the curve A2 would result. In that case, the overload at the high speeds would be avoided, but the axial force would rise considerably toward the ratio 1:3 and would be three times as great as would be required. For this reason, therefore, the gear would have to have much greater dimensions to prevent risk of destruction, or the gear would have to be operated with a fraction only of the normal load at all ratios deviating from the ratio 1:1. The overloads resulting in the cases just mentioned at various ratios are indicated by the hatched surfaces.

Fig. 8 illustrates the conditions for the construction shown in Fig. 5. The axial force produced by the united torques of the rings 79 and 81 is A3, while the axial force exactly required for the power transmission is A0. It will be seen that the resulting overloads are very small. They can be still further reduced if by a suitable selection of the leverage difference between A0 and A3 near the ratio 1:1 is still further reduced, and if then, according to the arrangement shown in Fig. 3, from the point where A3 equals A0 a reduction of the axial force is permitted to take place toward the ratio 1:3. Such an arrangement becomes, of course, a little more complicated than the one described with reference to Fig. 5, which in most practical instances will be found sufficient.

What I claim and desire to secure by Letters Patent is:

1. In a device of the class described, a multi-stage friction gear having a fixed-ratio rolling body and a race therefor and a variable-ratio rolling body and a race therefor, a pressure device comprising two rotatable members, one of said pressure members being rigidly connected to the said variable-ratio race, and gears between the said fixed-ratio race and the other of said pressure members, to reverse the direction of rotation of the said pressure member and to vary the torque applied thereto.

2. A device according to claim 1, wherein the reaction of the said fixed-ratio race is in the opposite direction to that of the said variable-ratio race so that, at a 1:1 ratio of the latter, the said opposed reactions balance each other; and wherein the axial pressure produced by the said pressure device will be proportional to the torque transmitted and will be produced irrespective of the absence of resultant reaction.

3. A device according to claim 1, wherein one of the said pressure members is provided with a brake means to enable the device to function differentially.

4. In a device of the class described, a multi-stage friction gear having rolling bodies in adhesive driving contact with races, means for opposing the torque reactions of the stages of said friction gear, said friction gear being arranged so that at a 1:1 ratio of transmission said reactions balance each other, and means including a pressure device operable at all times and even in the absence of reaction, to produce axial thrust in proportion to the torque being transmitted.

5. In a device of the class described, a multi-stage friction gear having races and rolling bodies therebetween and in adhesive driving contact therewith, said races being subjected to reactions of different magnitude, and means including a pressure device to produce axial pressure to maintain said adhesive driving contact which is proportional to the torque being transmitted and which is independent of the magnitude of the reactions on the said races.

6. In combination with a power transmission system in which power is transmitted from a driving to a driven element by the adhesive driving contact of races with rollers therebetween, a torque loading device for generating a pressure for maintaining the adhesive driving contact of the rollers with the races, said device including two relatively movable elements, means for causing a driving torque impressed on the system to generate a plurality of torques in parallel relation to each other, and means for modifying said generated torques and applying them to said elements so as to generate pressure to maintain said adhesive driving contact.

7. In combination with a power transmission system in which power is transmitted from a driving to a driven element by the adhesive driving contact of races with rollers therebetween, a pressure device for generating pressure for maintaining the adhesive driving contact between said rollers and said races, said device including two relatively movable elements, torque modifying means operatively associated with said elements, and means for applying to said torque modifying means a plurality of torques generated in said system and having a parallel relation to each other.

8. In combination with a power transmission system in which power is transmitted from a driving to a driven element by the adhesive driving contact of races with rollers therebetween, a torque loading device for generating pressure for maintaining the adhesive driving contact between said rollers and said races, said device including two relatively movable elements, torque modifying lever means operatively connected to one of said elements at one point of said means and having pivotal connection with the other of said elements at a second point thereof, means for applying a torque, generated in said system externally of said torque-modifying means, to one of said elements, and means for applying another torque, generated in said system externally of said lever means, to a third point of said torque-modifying means.

9. In combination with a power transmission system in which power is transmitted from a driving to a driven element by the adhesive driving contact of races with rollers positioned therebetween, a torque loading device for generating pressure for maintaining the adhesive driving contact between said rollers and said races, said device including two relatively movable elements, lever means pivotally connected to one of said elements at one point of said lever means and having pivotal connection with the other of said elements at a second point thereof, means for applying a torque, generated in said system externally of said lever means, to one of said elements, and means for applying another torque, generated in said system externally of said lever means, to a third point of said lever means.

10. In combination with a power transmission system in which power is transmitted from a driving to a driven element by the adhesive driving contact of races with rollers therebetween, a torque loading device for generating a pressure for maintaining the adhesive driving contact of the rollers with the races, said device including two relatively movable elements, means for causing a driving torque impressed on the system to generate torques in parallel relation to each other, means for applying one of said generated torques to one of said elements, lever means pivotally connected to said last-named element at one point of said lever means and having pivotal connection with the other of said elements at a second point thereof, and means for applying another of said generated torques to a third point of said lever means.

11. In combination with a power transmission system in which power is transmitted from a driving to a driven element by the adhesive driving contact of races with rollers therebetween, a torque loading device for generating pressure for maintaining the adhesive driving contact between said rollers and said races, said device including two relatively movable elements, torque modifying means acting as a lever operatively engaging one of said elements at one point of said lever and having pivotal connection with the other of said elements at a second point thereof, means for applying a torque to each of said elements, and means for applying another torque to said torque-modifying means at a third point of said lever.

12. In combination with a power transmission system in which power is transmitted from a driving to a driven element by the adhesive driving contact of races with rollers positioned therebetween, a torque loading device for generating pressure for maintaining the adhesive driving contact between said rollers and said races, said device including two relatively movable elements, a member acting as a lever pivotally connected to one of said elements, at one point of said lever and having pivotal connection with the other of said elements at a second point thereof, means for applying a torque to one of said elements, and means for applying another torque to said member at a third point of said lever.

13. An infinitely variable system comprising races and rollers in adhesive contact therewith, a torque loading device comprising two members and torque transmitting connections between each of said members and the said system, said members being angularly movable relatively to each other for causing an axial pressure between the races and rollers of the system, a third member movable relatively to the above said two members and means forming operative connections between the said third member and the said two members for modifying the said pressure in response to the said third member.

14. An infinitely variable transmission system comprising races and rollers in adhesive contact therewith, a torque loading device comprising two torque transmitting members angularly movable relatively to each other for generating an adhesive pressure between the races and rollers, a plurality of elements and each thereof being in torque transmitting engagement with each of the said two members, and a third torque transmitting member movable relatively to the said two members and pivotally engaging all of said elements.

15. An infinitely variable transmission system comprising races and rollers in adhesive contact therewith, a torque-loading device comprising two torque transmitting members angularly movable relatively to each other and adapted to spread apart and generate axial pressure incidental to such relatively angular movement, leverage means pivotally engaging, at spaced points thereof, each of the said two members, a third torque transmitting member movable independently of the said two torque transmitting members, and means causing a pivotal engagement between said third member and each of the said leverage means.

16. In a variable friction transmission comprising races and rollers, said transmission having a device for generating a pressure dependent upon the load imposed upon said transmission; means rendering said device effective; means transmitting the pressure generated in said device to said races to maintain the driving contact between said rollers and races, and a mechanism for modifying the pressure generated in said device at a given load of said transmission, said mechanism comprising a member relatively movable with respect to said first named means which render said device effective and free to move axially with respect to said second named means for transmitting the pressure generated in said device, and operative connections between said member and said device whereby the pressure generated varies in accordance to the combined influence of the load upon the transmission and the relative movement of said member.

RICHARD ERBAN.